(12) United States Patent
Shimohata

(10) Patent No.: US 11,934,616 B2
(45) Date of Patent: Mar. 19, 2024

(54) IMAGE DISPLAY SYSTEM, METHOD FOR CONTROLLING IMAGE DISPLAY SYSTEM, AND METHOD FOR CONTROLLING DISPLAY APPARATUS

(71) Applicant: SEIKO EPSON CORPORATION, Tokyo (JP)

(72) Inventor: Hiroya Shimohata, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/558,703

(22) Filed: Dec. 22, 2021

(65) Prior Publication Data

US 2022/0197430 A1  Jun. 23, 2022

(30) Foreign Application Priority Data

Dec. 23, 2020 (JP) ................ 2020-213279

(51) Int. Cl.
*G06F 3/042* (2006.01)

(52) U.S. Cl.
CPC ................. *G06F 3/0425* (2013.01)

(58) Field of Classification Search
CPC .... G06F 3/0425; G06F 3/03545; G06F 3/016; H04N 9/3179; H04N 9/3194
See application file for complete search history.

(56) References Cited

U.S. PATENT DOCUMENTS

| | | | |
|---|---|---|---|
| 2008/0148184 A1 | 6/2008 | Davis | |
| 2013/0069870 A1* | 3/2013 | Ichieda | G06F 3/03545 345/157 |
| 2013/0162538 A1* | 6/2013 | Ichieda | G09G 5/00 345/173 |
| 2013/0176216 A1* | 7/2013 | Ichieda | H04N 9/312 345/157 |
| 2013/0179599 A1* | 7/2013 | Ichieda | G06F 3/03543 710/8 |
| 2014/0071099 A1* | 3/2014 | Kubota | G06F 3/04883 345/179 |
| 2014/0160076 A1* | 6/2014 | Ichieda | G06F 3/0425 345/175 |

(Continued)

FOREIGN PATENT DOCUMENTS

| | | |
|---|---|---|
| JP | 2010-514072 | 4/2010 |
| JP | 2015-138472 | 7/2015 |
| JP | 2016-105264 | 6/2016 |

*Primary Examiner* — Benyam Ketema

(74) *Attorney, Agent, or Firm* — Dority & Manning, P.A.

(57) ABSTRACT

A method for controlling an image display system includes detecting a position to which a pointing element is pointing on a fourth image, identifying first coordinates in a coordinate system of the fourth image, the first coordinates represent the position in the fourth image, acquiring first information representing resolution of a second image and second information representing a position of a third image relative to the second image on an image supplier, converting the first coordinates into second coordinates in a coordinate system of a first image, which represent a position in the first image, based on the first information and the second information, and transmitting the second coordinates to the image supplier and carrying out a process based on the second coordinates when the image supplier receives the second coordinates from a display apparatus.

6 Claims, 8 Drawing Sheets

(56) References Cited

U.S. PATENT DOCUMENTS

| | | | |
|---|---|---|---|
| 2014/0168168 A1* | 6/2014 | Ichieda | G06F 3/0425 |
| | | | 345/175 |
| 2015/0042561 A1* | 2/2015 | Kubota | G06F 3/1454 |
| | | | 345/156 |
| 2016/0018907 A1* | 1/2016 | Ichieda | G06F 3/033 |
| | | | 345/157 |
| 2016/0140745 A1 | 5/2016 | Natori et al. | |
| 2017/0277358 A1* | 9/2017 | Kihara | G06F 3/04883 |
| 2017/0322636 A1* | 11/2017 | Ichieda | G06F 3/033 |
| 2018/0039380 A1* | 2/2018 | Fujimori | G06F 3/0425 |
| 2018/0047322 A1* | 2/2018 | Ano | G06F 3/0425 |
| 2019/0012130 A1* | 1/2019 | Honda | H04N 5/2624 |
| 2019/0066552 A1* | 2/2019 | Takagi | H04N 9/3185 |
| 2020/0007832 A1* | 1/2020 | Nakagawa | G06F 3/1423 |
| 2020/0042276 A1* | 2/2020 | Wang | G09G 5/14 |
| 2020/0082795 A1* | 3/2020 | Ano | G09G 3/001 |
| 2020/0150824 A1* | 5/2020 | Nakashin | G06F 3/04883 |
| 2020/0275069 A1* | 8/2020 | Tanaka | H04N 9/3185 |
| 2020/0382750 A1* | 12/2020 | Ano | H04N 9/3179 |
| 2021/0056937 A1* | 2/2021 | Sakai | G06F 3/1454 |
| 2021/0271380 A1* | 9/2021 | Sakamoto | G06F 3/04812 |
| 2022/0398059 A1* | 12/2022 | Zhu | G06F 3/0482 |

\* cited by examiner

IMAGE DISPLAY SYSTEM, METHOD FOR CONTROLLING IMAGE DISPLAY SYSTEM, AND METHOD FOR CONTROLLING DISPLAY APPARATUS

The present application is based on, and claims priority from JP Application Serial Number 2020-213279, filed Dec. 23, 2020, the disclosure of which is hereby incorporated by reference herein in its entirety.

BACKGROUND

1. Technical Field

The present disclosure relates to an image display system, a method for controlling the image display system, and a method for controlling a display apparatus.

2. Related Art

There is a known projector having an interactive function of projecting the screen of a PC (personal computer) onto a screen and inputting a variety of instructions to the projected image by using a pointing element, such as an electronic pen and a user's finger. The projector allows the user to draw letters overlaid on the projected image by using the pointing element or specify an icon displayed in the projected image to execute an action associated with the icon.

For example, JP-A-2016-105264 discloses a display system formed of a projector including the interactive function and a PC coupled to the projector. The display system allows the PC to recognize an operation performed on an image projected by the projector as a mouse operation by transmitting information on the operation position to which the pointing element is pointing to the PC.

In the display system described in JP-A-2016-105264, however, the pointing element position recognized by the PC deviates in some cases from the pointing element position in the projected image. In detail, when the PC is so set that the display thereof operates in an expanded screen mode, the pointing element position in the image projected by the projector does not correspond to the pointing element position on the expanded screen of the PC, resulting in a problem of deviation of the pointing element position recognized by the PC.

That is, there is a need for an image display system that allows an operation at a pointing element position in the projected image to be properly performed also when the PC operates in the expanded screen mode.

SUMMARY

A method for controlling an image display system according to an aspect of the present application includes causing an image supplier to display a second image contained in a first image and transmit an image signal based on a third image contained in the first image and different from the second image to a display apparatus, causing the display apparatus to display a fourth image based on the image signal, detect a position to which a pointing element is pointing on the fourth image, identify first coordinates in a coordinate system of the fourth image, which represent the pointing element position in the fourth image, acquire first information representing resolution of the second image and second information representing a position of the third image relative to the second image on the image supplier, convert the first coordinates into second coordinates in a coordinate system of the first image, which represent a position in the first image, based on the first information and the second information, and transmit the second coordinates to the image supplier, and causing the image supplier to carry out a process based on the second coordinates when the image supplier receives the second coordinates from the display apparatus.

An image display system according to another aspect of the present application is an image display system including an image supplier and a display apparatus provided so as to be bi-directionally communicable with the image supplier. The image supplier includes a display section that displays a second image contained in a first image and a first communication section that transmits an image signal based on a third image contained in the first image and different from the second image. The display apparatus includes a display section that receives the image signal and displays a fourth image based on the received image signal, a detection section that detects a position to which a pointing element is pointing on the fourth image, an identification section that identifies first coordinates in a coordinate system of the fourth image, which represent the detected pointing element position in the fourth image, an acquisition section that acquires first information representing resolution of the second image and second information representing a position of the third image relative to the second image on the image supplier, a computation section that converts the first coordinates into second coordinates in a coordinate system of the first image, which represent a position in the first image, based on the first information and the second information, and a second communication section that transmits the second coordinates to the image supplier.

A method for controlling a display apparatus according to another aspect of the present application is a method for controlling a display apparatus that communicates with an image supplier that displays a second image contained in a first image and transmits an image signal based on a third image contained in the first image and different from the second image, and the display apparatus displays a fourth image based on the image signal received from the image supplier, detects a position to which a pointing element is pointing on the fourth image, identifies first coordinates in a coordinate system of the fourth image, which represent the pointing element position in the fourth image, acquires first information representing resolution of the second image and second information representing a position of the third image relative to the second image on the image supplier, converts the first coordinates into second coordinates in a coordinate system of the first image, which represent a position in the first image, based on the first information and the second information, and transmits the second coordinates to the image supplier.

DESCRIPTION OF EXEMPLARY EMBODIMENTS

First Embodiment

Overview of Image Display System

Figure 1:
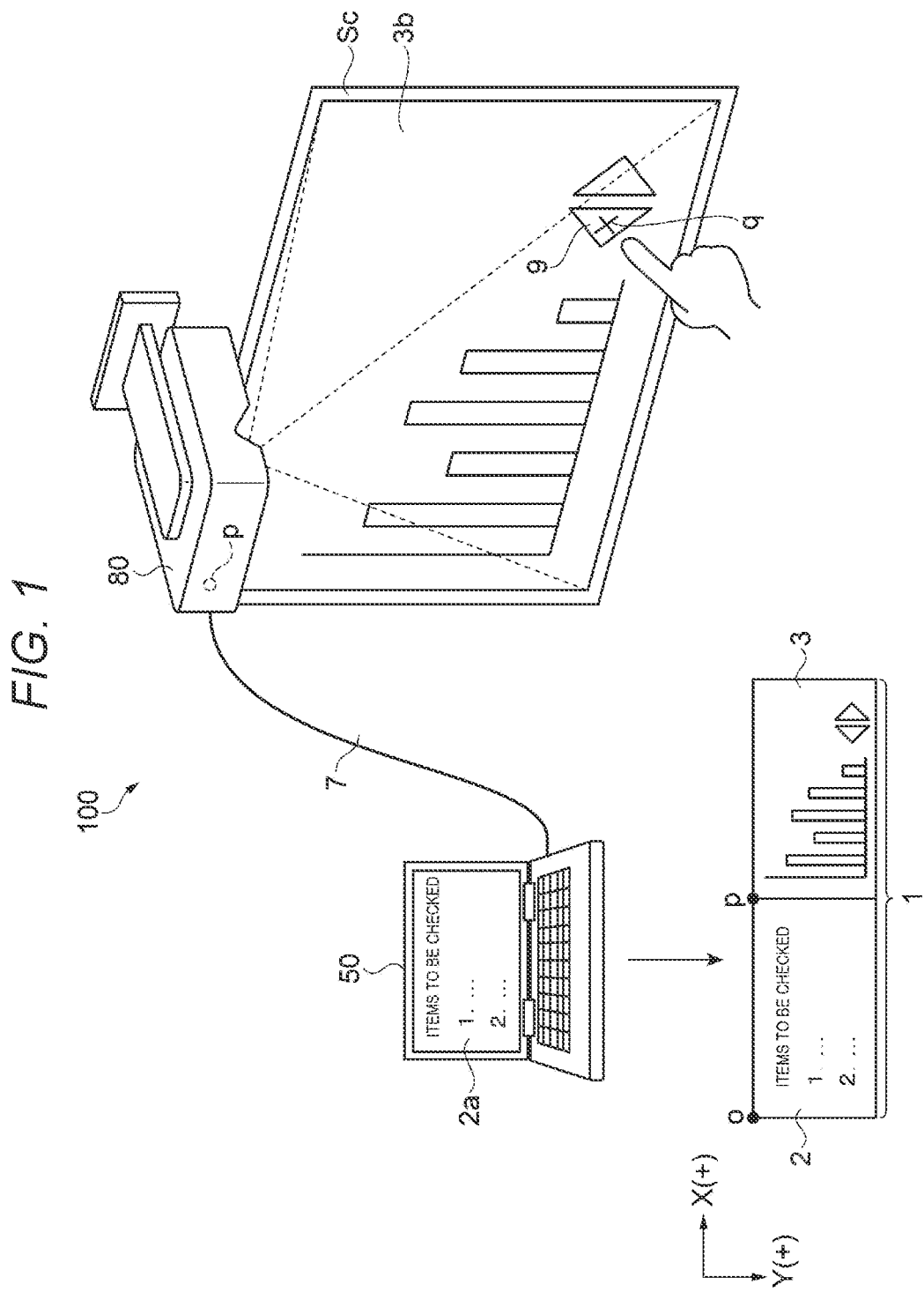
FIG. 1 is an overall view of an image display system according to a first embodiment.

FIG. 1 is a schematic configuration diagram of an image display system according to the present embodiment.

An image display system 100 is formed of a PC 50 as an image supplier and a projector 80 as a display apparatus, as shown in FIG. 1. The PC 50 and the projector 80 are provided so as to be bi-directionally communicable with each other.

The PC 50 is a laptop personal computer and has a multi-display function. The PC 50 is not limited to a laptop PC and only needs to be an image supplier provided with a built-in operating system (OS) having a multi-display function. For example, the PC 50 may be a desktop PC or a portable terminal, such as a tablet computer or a smartphone.

The PC 50 uses an expansion mode of the multi-display function to display images, as shown in FIG. 1. In detail, the PC 50 internally recognizes a horizontally elongated overall image 1, in which a first image 2 is disposed on the left and a second image 3 is disposed on the right, with respect to an origin o. The first image 2 on the left in the overall image 1 is displayed as a first image 2a in a display section of the PC 50, and the second image 3 on the right in the overall image 1 is projected by the projector 80 and displayed as a second image 3b on a screen SC. That is, the second image 3 is located on the right side of the first image 2.

Figure 5:
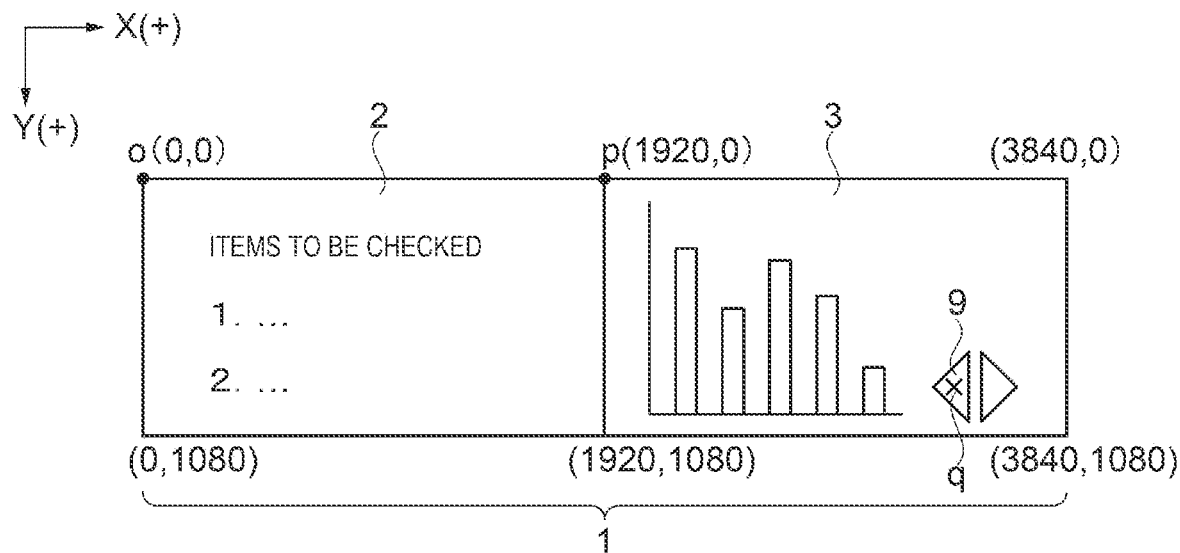
FIG. 5 shows the resolution in an overall image containing horizontally arranged images.
Figure 6:
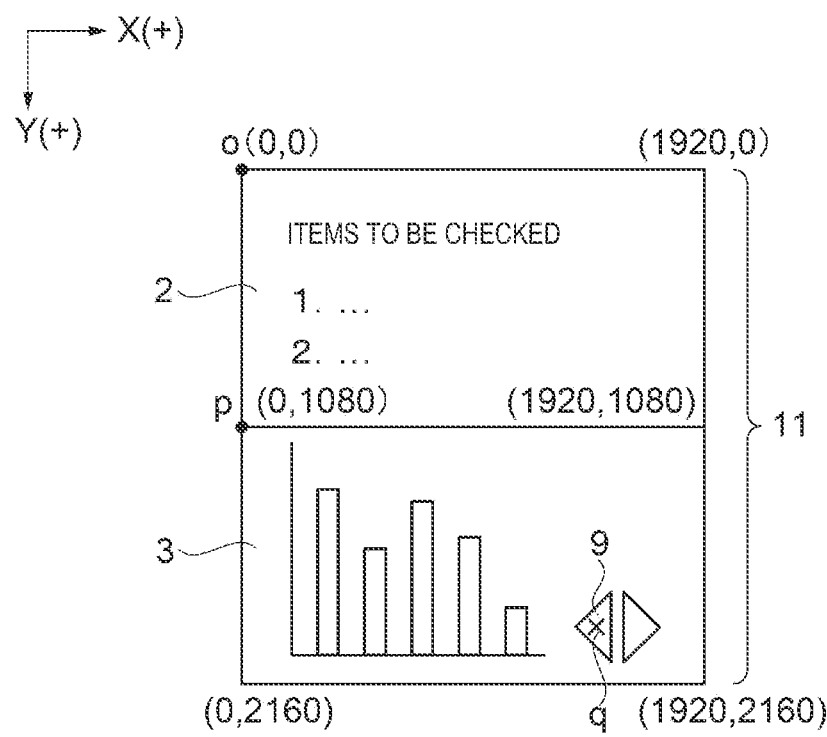
FIG. 6 shows the resolution in an overall image containing vertically arranged images.

The state in which the second image 3 is located on the right side of the first image 2 corresponds, for example, to a case where the x coordinate value of an origin p of the second image 3 is greater than the x coordinate value of the origin o of the first image 2, as shown in FIG. 5. Similarly, the state in which the second image 3 is located on the left side of the first image 2 corresponds, for example, to a case where the x coordinate value of the origin p of the second image 3 is smaller than the x coordinate value of the origin o of the first image 2. A state in which the second image 3 is located below the first image 2 corresponds, for example, to a case where the y coordinate value of the origin p of the second image 3 is greater than the y coordinate value of the origin o of the first image 2, as shown in FIG. 6. Similarly, a state in which the second image 3 is located above the first image 2 corresponds, for example, to a case where the y coordinate value of the origin p of the second image 3 is smaller than the y coordinate value of the origin o of the first image 2.

The description will refer to FIG. 1 again.

The projector 80 is a projector having an interactive function and is installed above the screen SC. As a preferable example, the screen SC is a whiteboard and is provided so as to allow writing with a pen over the projected image, manipulation of projected and displayed icons with a finger, and other operations. The projector 80 is set in a mouse mode in which operations performed with a pen or any other pointing element or with a finger as operations performed with a mouse. In the preferable example, the PC 50 and the projector 80 are coupled to each other with a cable 7, which complies with the HDMI (registered trademark: high-definition multimedia interface) standard.

The overall image 1 corresponds to a first image, the first image 2 corresponds to a second image, and the second image 3 corresponds to a third image.

FIG. 1 shows a meeting scene in which the first image 2 on the PC 50 displays items to be checked in the meeting and the second image 3b projected by the projector 80 displays a performance-showing bar graph. A user touches a page return icon 9 displayed in the second image 3b to turn over the bar graph displaying page back to the preceding page.

According to the image display system 100, an operation performed on the second image 3b projected by the projector 80 can be properly executed on the PC 50 in the expansion mode by using a control method described later. The configurations of the PC 50 and the projector 80 will be subsequently described in detail.

Configurations of PC and Projector

Figure 2:
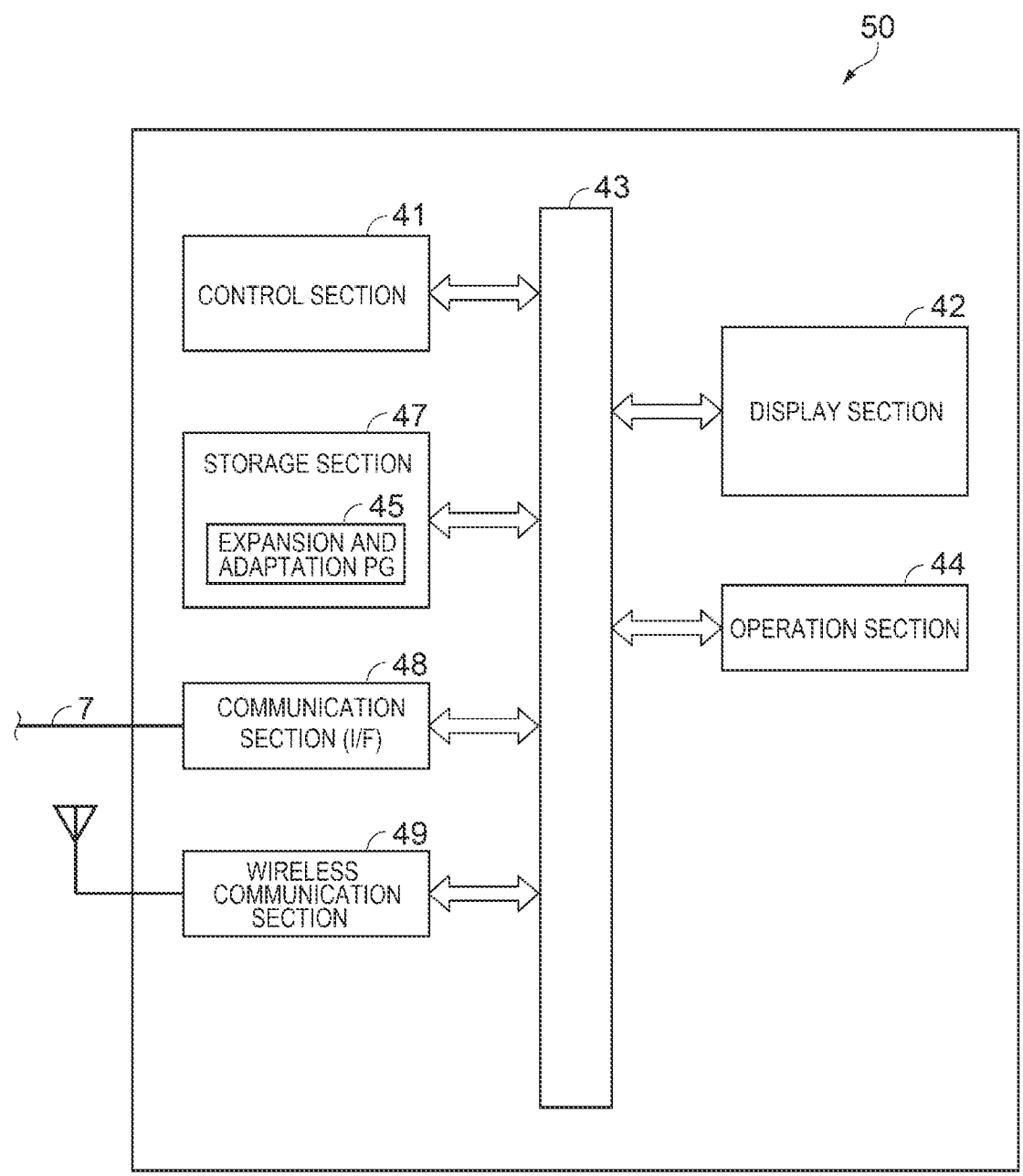
FIG. 2 is a block diagram showing a schematic configuration of a PC.

FIG. 2 is a block diagram showing a schematic configuration of the PC.

The PC 50 is formed, for example, of a control section 41, a display section 42, an operation section 44, a storage section 47, a communication section 48, and a wireless communication section 49, as shown in FIG. 2. The control section 41 is coupled to each of the sections described above via a system bus 43. The communication section 48 and the wireless communication section 49 correspond to a first communication section.

The control section 41 includes one or more processors. The control section 41 operates in accordance with the operating system (OS) and an application program stored in the storage section 47 to supervise and control the action of the PC 50.

The display section 42 includes a display device, such as a liquid crystal display and an organic EL (electro-luminescence) display, and displays an image based on image data containing an image signal.

The operation section 44 is a keyboard or a touchpad and accepts operations inputted by an operator. When the operator operates the operation section 44, the operation section 44 outputs an operation signal according to the content of the operation to the control section 41 via the system bus 43.

The storage section 47 is formed of a RAM (random access memory), a ROM (read only memory), and other memories. The storage section 47 stores, for example, the OS, application programs, and a variety of data. The application programs include a PC expansion and adaptation program 45, which will be described later.

The communication section 48 is an interface section and includes an interface circuit and an HDMI terminal. The cable 7, which complies with the HDMI standard, is coupled to the HDMI terminal.

The wireless communication section 49 includes a wireless communication device for wireless communication based, for example, on a wireless LAN (local area network) or Bluetooth (registered trademark). The wireless communication section 49 transmits and receives information via wireless connection to and from external apparatuses, such as the projector 80, under the control of the control section 41.

Figure 3:
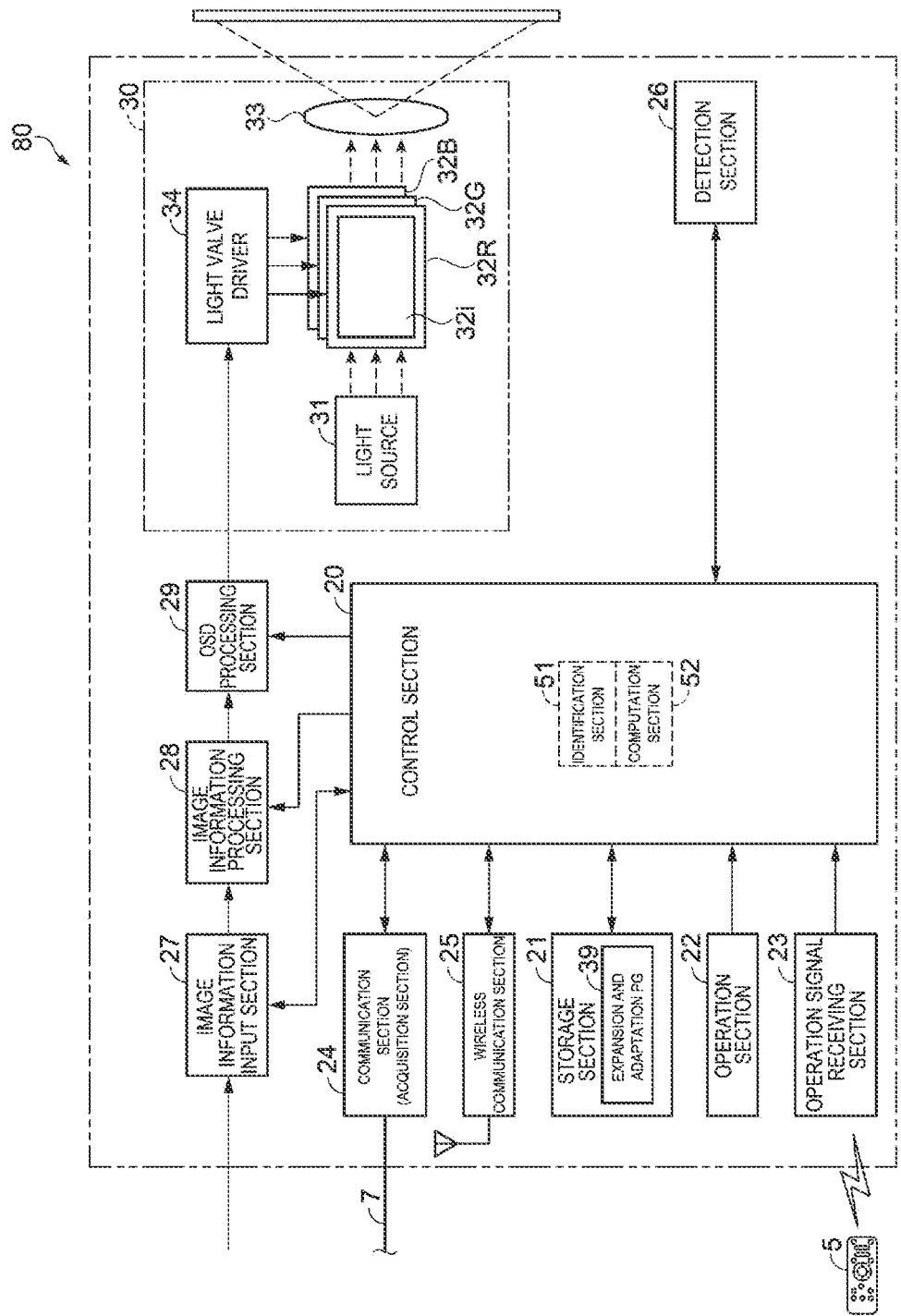
FIG. 3 is a block diagram showing a schematic configuration of a projector.

FIG. 3 is a block diagram showing a schematic configuration of the projector.

The projector 80 is formed, for example, of a control section 20, a storage section 21, an operation section 22, an operation signal receiving section 23, a communication section 24, a wireless communication section 25, a detection section 26, an image information input section 27, an image information processing section 28, an OSD processing section 29, and an image projection section 30 as a display section, as shown in FIG. 3. The communication section 24 and the wireless communication section 25 correspond to a second communication section.

The projector 80 projects an image from the image projection section 30 based on image data containing an image signal inputted to the image information input section 27.

The control section 20 includes one or more processors and operates in accordance with a control program stored in the storage section 21 to supervise and control the action of the projector 80.

The storage section 21 includes a RAM and a ROM. The RAM is used to temporarily store a variety of data and other pieces of information, and the ROM stores the control program, control data, and other pieces of information for controlling the action of the projector 80. The control program includes a Pj expansion and adaptation program 39, which will be described later. There are three variations of the Pj expansion and adaptation program 39, and Pj expansion and adaptation programs 39a to 39c corresponding to embodiments are stored in the ROM.

The operation section 22 includes a plurality of operation keys that allow the operator to issue a variety of instructions to the projector 80. The operation keys provided at the operation section 22 include a "power key" for switching a power-on state to a power-off state and vice versa, a "menu key" for displaying a menu for making a variety of settings, and "arrow keys" for selecting an item in the menu. When the operator operates any of the variety of operation keys of the operation section 22, the operation section 22 outputs an operation signal according to the content of the operator's operation to the control section 20.

The operation signal receiving section 23 is an infrared signal receiving section and includes a light receiver, a decoder, and other components that are not shown in the figures. The operation signal receiving section 23 receives and decodes an infrared operation signal transmitted from a remote control 5 and transmits the decoded signal to the control section 20. The remote control 5 is provided with arrow keys for selecting a selection item, an enter key, and a numeric keypad for inputting numbers. The remote control 5 and the operation signal receiving section 23 may instead be a remote control and a receiving section compliant with Bluetooth, respectively.

The communication section 24 is an interface section and includes an interface circuit and an HDMI terminal. The cable 7, which complies with the HDMI standard, is coupled to the HDMI terminal.

The wireless communication section 25 includes a wireless communication device for wireless communication based, for example, on a wireless LAN or Bluetooth. The wireless communication section 25 transmits and receives information via wireless connection to and from external apparatuses, such as the PC 50, under the control of the control section 20.

The detection section 26 is a camera including an imaging device, such as a CCD (charge coupled device) sensor and a CMOS (complementary metal oxide semiconductor) sensor. The detection section 26 captures an image of the second image 3b projected from the image projection section 30 and outputs data on the captured image to the control section 20 under the control of the control section 20. The control section 20 analyzes the captured image data to identify the position of the pointing element or a finger.

The detection section 26 may include a light source and an optical sensor, cause the light source to radiate visible light or infrared light toward the screen SC, cause the optical sensor to receive the reflected light, and analyze the reflected light to identify the position of the pointing element or a finger.

The image information input section 27 receives the image information containing an image signal supplied from the PC 50 via the cable 7. The image information input section 27 may instead receive the image information from the image supplier via wireless communication using the wireless communication section 25. The image information input section 27 can still instead receive image information stored in the storage section 21 and supplied from the control section 20. The image information input section 27 performs a variety of types of image processing as required on the image information inputted from the image supplier or the control section 20 and outputs the processed image information to the image information processing section 28 under the control of the control section 20.

The image information processing section 28 performs necessary image processing on the image information inputted from the image information input section 27 and outputs the processed image information to the OSD processing section 29 under the control of the control section 20.

The OSD processing section 29 carries out the process of superimposing an OSD (on-screen display) image, such as a message image, a setting screen, and a menu image, on an input image and displaying the superimposed image under the control of the control section 20. The OSD processing section 29 includes an OSD memory that is not shown in the figures and stores OSD image information representing figures, fonts, and other objects for forming OSD images. The OSD image information further includes image information on the setting screen, which will be described later. When the control section 20 instructs superimposition of an OSD image, the OSD processing section 29 reads necessary OSD image information from the OSD memory and combines the OSD image information with image information inputted from the image information processing section 28 so that the OSD image is superimposed on the input image in a predetermined position. The image information combined with the OSD image information is outputted to a light valve driver 34 of the image projection section 30.

The image projection section 30 is formed of a light source 31, three liquid crystal light valves 32R, 32G, and 32B as light modulators, a projection lens 33 as a projection system, and the light valve driver 34.

The image projection section 30 modulates the light outputted from the light source 31 with the aid of the liquid crystal light valves 32R, 32G, and 32B to form image light and projects the image light via the projection lens 33.

The light source 31 includes a solid-state light source, such as a light emitting diode and a semiconductor laser. The light source 31 may instead include a discharge-type light source lamp, such as an ultrahigh-pressure mercury lamp and a metal halide lamp. The light outputted from the light source 31 is converted by an optical integration system that is not shown into light having a substantially uniform luminance distribution, and a color separation system that is not shown separates the converted light into red (R), green (G), and blue (B) color light components, which are the three primary color components of light and then enter the liquid crystal light valves 32R, 32G, and 32B, respectively.

The liquid crystal light valves 32R, 32G, and 32B are each formed, for example, of a transmissive liquid crystal panel including a liquid crystal material encapsulated between a pair of transparent substrates. The liquid crystal panels each have a rectangular image formation region 32i formed of a plurality of pixels arranged in a matrix, and a drive voltage is applicable to the liquid crystal material on a pixel basis.

The light valve driver 34 forms an image in the image formation region 32i of each of the liquid crystal light valves 32R, 32G, and 32B. Specifically, the light valve driver 34 applies a drive voltage according to the image information inputted from the OSD processing section 29 to each of the pixels in the image formation regions 32i to set the pixel to have optical transmittance according to the image information. The light outputted from the light source 31 passes through the image formation regions 32i of the liquid crystal light valves 32R, 32G, and 32B and is therefore modulated on a pixel basis to form image light fluxes according to the image information on a color light flux basis. The thus formed color image light fluxes are combined with one another on a pixel basis by a light combining system that is not shown into image light representing a color image, and the projection lens 33 enlarges and projects the image light.

The image information input section 27, the image information processing section 28, and OSD processing section 29 may be formed of one or more processors or any other components or dedicated processing devices, such as an ASIC (application specific integrated circuit) and an FPGA (field programmable gate array).

The above description has been made with reference to the configuration in which the projector 80 includes the three liquid crystal light valves 32R, 32G, and 32B as the light modulators, and reflective light modulators, such as reflective liquid crystal light valves, may instead be used. Still instead, for example, a digital mirror device that includes micromirrors as pixels and controls the direction in which light incident thereon exits on a micromirror basis to modulate the light outputted from the light source 31 can be used as each of the light modulators. Furthermore, a plurality of light modulators are not necessarily provided on a color light flux basis, and a single light modulator may modulate a plurality of color light fluxes in a time division manner.

Procedure of PC Expansion and Adaptation Program

Figure 4:
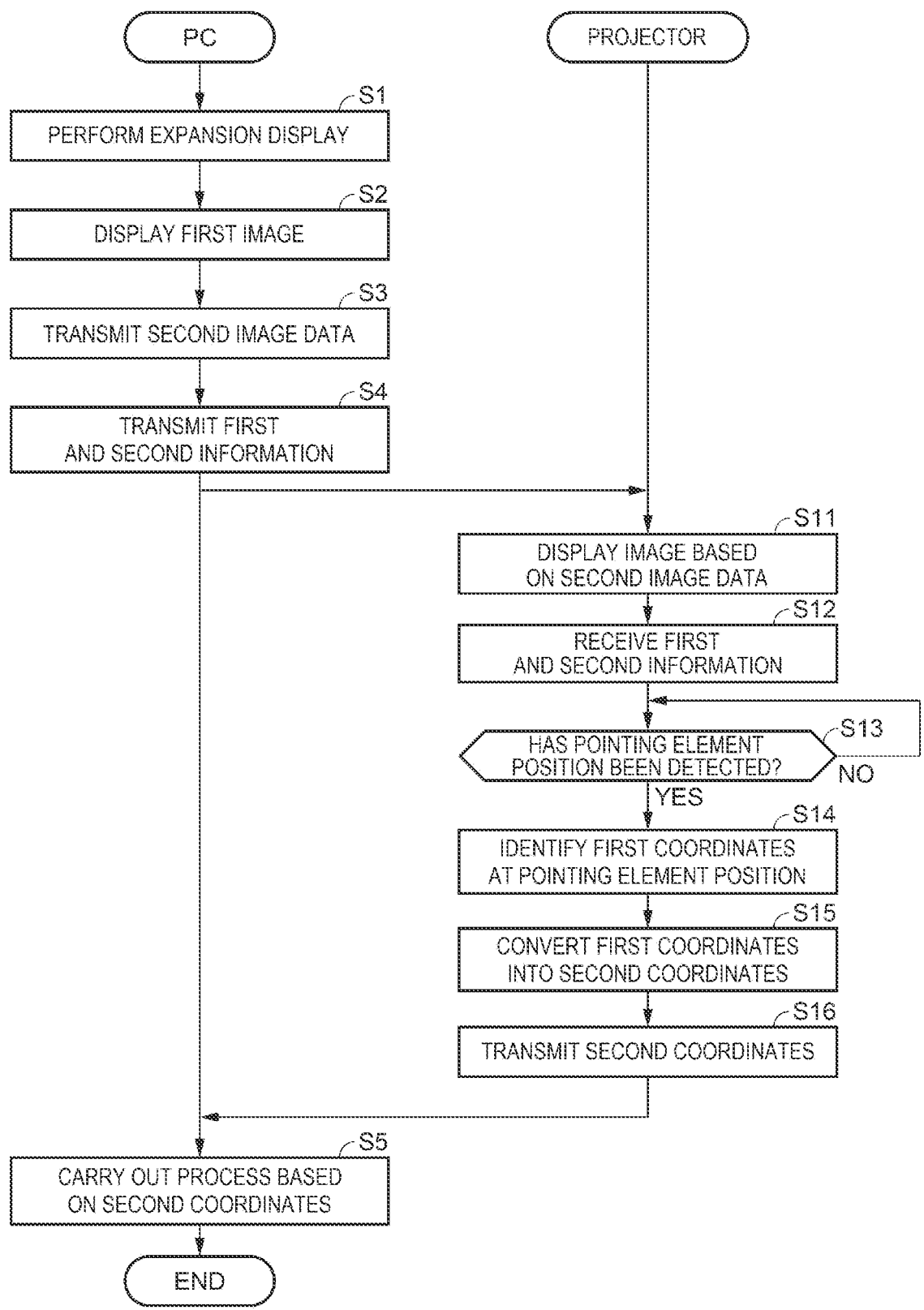
FIG. 4 is a flowchart showing the procedure of processes in a PC expansion and adaptation program.

FIG. 4 is a flowchart showing the procedure of processes in the PC expansion and adaptation program. FIG. 5 shows the aspect of the coordinates in an image in a horizontal expansion mode.

A control method used in the expansion mode and executed by the PC 50 equipped with the PC expansion and adaptation program 45 and the projector 80 will be described with reference primarily to FIG. 4 along with FIGS. 1 and 5 as appropriate.

In the following description, each step is executed primarily by the control section 41 of the PC 50 and the control section 20 of the projector 80.

In step S1, a display setting expansion mode is selected on the PC 50. As an example, it is assumed in the expansion mode that the PC 50 displays the first image 2 on the left in the overall image 1 and the projector 80 displays the second image 3 on the right in the overall image 1, as shown in FIG. 1. The PC expansion and adaptation program 45 in the storage section 47 is set to start automatically when the expansion mode is selected.

In step S2, the PC 50 displays the first image 2a based on the first image 2. In detail, an image based on an image signal carrying the first image 2 is displayed as the first image 2a on the display section 42 of the PC 50.

In step S3, the PC 50 transmits image information containing an image signal carrying the second image 3 to the projector 80. That is, the PC 50 displays the first image 2 contained in the overall image 1 and transmits the image signal based on the second image 3 contained in the overall image 1 and different from the first image 2 to the projector 80 in steps S1 to S3.

In step S4, the PC 50 transmits to the projector 80 first information representing the resolution of the first image 2 and second information representing the position of the second image 3 relative to the first image 2. In a preferable example, the first information and the second information are transmitted with the aid of a CEC (consumer electronics control) function of the HDMI-compliant cable 7. In detail, the first information and the second information are transmitted in response to a VSC (vendor specific command) command through a signal line for the CEC function in the cable 7. That is, the image signal, the first information, and the second information are transmitted in parallel in the cable 7.

In step S11, the projector 80 projects a second image 3b based on the received image signal carrying the second image 3. The second image 3b corresponds to a fourth image.

In step S12, the projector 80 receives the first information and the second information. In detail, the communication section 24 as an acquisition section receives the first information and the second information. Upon receipt of the first information and the second information, the projector 80 activates the Pj expansion and adaptation program 39a in the storage section 21. In the above description, two separate steps are described to clarify the content of the process, but, in reality, the receipt of the image signal carrying the second image 3 and the receipt of the first information and the second information are performed in parallel via the cable 7, as described above.

In step S13, pointing when an operation is performed with the pointing element on the second image 3b projected on the screen SC, the projector 80 detects the pointing element position. In detail, the detection section 26 captures an image of the second image 3b and analyzes the data on the captured image to check whether any operation has been performed or not, and detects the pointing element position when an operation has been performed. When the pointing element position is detected, the projector 80 proceeds to step S14. When no operation has been performed, or when the pointing element position has not been successfully detected, the detection continues.

In step S14, the projector 80 identifies first coordinates that are the coordinates of the detected pointing element position. In detail, the control section 20 functions as an identification section 51, which compares the coordinates of the first information and the second information in the captured image data with those in the coordinate system of the second image 3, to identify the first coordinates. For example, when the page return icon 9 in the second image 3b is operated, the coordinates of a pointing element position q are identified as the first coordinates (1550, 900) in an XY coordinate system with respect to the origin p, as shown in FIG. 1. The second image 3b has a high-definition (1920× 1080) resolution, and the upper left corner of the second image 3b is the origin p.

In step S15, the projector 80 converts the first coordinates to second coordinates. In detail, the projector 80 converts the identified first coordinates into the second coordinates in the coordinate system of the overall image 1 based on the first information and the second information.

For example, in the case of the pointing element position q, the first information, which indicates that the resolution of the first image 2 is the high-definition resolution, shows that the resolution of the expanded second image 3 is also the high-definition resolution. The reason for this is that two images in the expansion mode typically has the same resolution. The second information then indicates that the second image 3 is located on the right side of the first image 2. The coordinate system of the overall image 1 on the PC 50 is thus identified, as shown in FIG. 5. In the coordinate system of the overall image 1, the second image 3 is located on the right side of the first image 2 with the upper left corner of the first image 2 being the origin o, so that the X coordinate is 1920×2=3840 at the maximum. The Y coordinate is 1080 at the maximum. The coordinate system of the overall image 1 is therefore a horizontally elongated coordinate system having XY coordinates (3840, 1080) at the maximum.

Consider now a case where the first coordinates (1550, 900) at the pointing element position q, which have been identified in the coordinate system of the second image 3, are directly transmitted to the PC 50, and the first coordinates are misrecognized as the coordinates in the first image 2 in the coordinate system of the overall image 1 on the PC 50, so that the page return operation is not undesirably performed. To avoid the situation described above, the first coordinates at the pointing element position q are converted into the second coordinates in the coordinate system of the overall image 1. In detail, the coordinates of the origin (1920, 0) of the second image 3 are added to the first coordinates (1550, 900), and the resultant coordinates are converted into the second coordinates (3470, 900). The conversion is performed by the control section 20 that functions as a computation section 52, which recognizes the coordinate system of the overall image 1 from the first information and the second information and adds the coordinates of the origin of the second image 3 to the first coordinates.

In step S16, the projector 80 transmits the converted second coordinates to the PC 50. When the image projected by the projector 80 is the first image 2, the first coordinates and the second coordinates are in the same coordinate system, so that the conversion process in step S15 is unnecessary, and the first coordinates identified in step S14 only need to be directly transmitted in step S16.

In step S5, the PC 50 carries out a process based on the received second coordinates. For example, when the second coordinates (3470, 900) are received, the function associated with the page return icon 9 disposed at the pointing element position q in the second image 3 in FIG. 5 is executed.

In addition to the execution of the function assigned to an icon, the OSD processing section 29 can superimpose a content drawn with the pointing element, such as a pen, the content being, for example, letters written on the screen SC, on the second image 3 in such a way that the drawn content is superimposed on the projected image.

FIG. 6 shows the aspect of the coordinates in an image in a vertical expansion mode and corresponds to FIG. 5. The above description has been made of an example in the horizontal expansion mode, and the control method can be similarly applied to the vertical expansion mode, in which two images are arranged vertically.

It is assumed that the expansion mode is so set that the PC 50 displays the first image 2 on the upper side in an overall image 11 and the projector 80 displays the second image 3 on the lower side in the overall image 11, as shown in FIG. 6. When the page return icon 9 is operated in the coordinate system of the second image 3 projected by the projector 80, the coordinates of the pointing element position q are identified as the first coordinates (1550, 900) in step S14. The resolution in the first information received in step S12 is the high-definition resolution, and the position of the second image 3 relative to the first image 2 in the second information is the lower position.

In step S15, the projector 80 first identifies the coordinate system, shown in FIG. 6, of the overall image 11 on the PC 50. In the coordinate system in the overall image 11, the second image 3 is disposed below the first image 2 with the upper left corner of the first image 2 being the origin o, so that the Y coordinate is 1080×2=2160 at the maximum. The X coordinate is 1920 at the maximum. The coordinate system of the overall image 11 is therefore a vertically elongated coordinate system having XY coordinates (1920, 2160) at the maximum. The first coordinates of the pointing element position q are then converted into the second coordinates in the coordinate system of the overall image 11. In detail, the coordinates of the origin (0, 1080) of the second image 3 are added to the first coordinates (1550, 900), and the resultant coordinates are converted into the second coordinates (1550, 1980). In step S16, the projector 80 transmits the converted second coordinates to the PC 50.

In step S5, the PC 50 carries out a process based on the received second coordinates. For example, when the second coordinates (1550, 1980) are received, the function associated with the page return icon 9 disposed at the pointing element position q in the second image 3 in FIG. 6 is executed.

When the image projected by the projector 80 is the first image 2, the first coordinates and the second coordinates are in the same coordinate system, so that the conversion process in step S15 is unnecessary, and the first coordinates identified in step S14 only need to be directly transmitted in step S16.

As described above, the image display system 100 according to the present embodiment and the method for controlling the system can provide the following effects.

The image display system 100 includes the PC 50 and the projector 80 provided so as to be bi-directionally communicable with the PC 50. The PC 50 includes the display section 42, which displays the first image 2 as the second image contained in the overall image 1 as the first image, and the first communication section, which transmits an image signal based on the second image 3 as the third image contained in the overall image 1 and different from the first image 2. The projector 80 includes the image projection section 30 as the display section, which displays the second image 3b as the fourth image based on the received image signal, the detection section 26, which detects the position to which the pointing element is pointing on the second image 3b, the identification section 51, which identifies the first coordinates in the coordinate system of the second image 3, which represent the detected pointing element position in the second image 3b, the communication section 24, which acquires the first information representing the resolution of the first image 2 and the second information representing the position of the second image 3 relative to the first image 2 on the PC 50, the computation section 52, which converts the first coordinates into the second coordinates in the coordinate system of the overall image 1, which represent the position in the overall image 1, based on the first information and the second information, and the communication section 24 as the second communication section, which transmits the second coordinates to the PC 50.

According to the image display system 100, based on the first information representing the resolution of the first image 2 and the second information representing the position of the second image 3 relative to the first image 2 on the PC 50, the projector 80 converts the first coordinates representing the position to which the pointing element is pointing into the second coordinates in the coordinate system of the overall image, which represent the position in the overall image 1, and transmits the second coordinates to the projector 80.

The PC 50 can therefore correctly recognize the pointing element position in the second image 3b projected by the projector 80 by using the second coordinates that are converted coordinates in the coordinate system of the overall image 1.

An image display system 100 that allows an operation at a pointing element position in a projected image to be properly performed also when the PC 50 operates in the expansion mode can therefore be provided.

According to the method for controlling the image display system 100, the PC 50 displays the first image 2 contained in the overall image 1 and transmits an image signal based on the second image 3 contained in the overall image 1 and different from the first image 2 to the projector 80. The projector 80 then displays the second image 3b based on the image signal, detects the position to which the pointing element is pointing on the second image 3b, identifies the first coordinates in the coordinate system of the second image 3, which represent the pointing element position in the second image 3b, acquires the first information representing the resolution of the first image 2 and the second information representing the position of the second image 3 relative to the first image 2 on the PC 50, converts the first coordinates into the second coordinates in the coordinate system of the overall image 1, which represent the position in the overall image 1, based on the first information and the second information, and transmits the second coordinates to the projector 80. When the PC 50 receives the second coordinates from the projector 80, the PC 50 carries out a process based on the second coordinates. The projector 80 may proactively carry out, as the method for controlling the display apparatus, steps up to transmission of the second coordinates.

According to the method described above, based on the first information representing the resolution of the first image 2 and the second information representing the position of the second image 3 relative to the first image 2 on the PC 50, the projector 80 converts the first coordinates representing the position to which the pointing element is pointing into the second coordinates in the coordinate system of the overall image, which represent the position in the overall image 1, and transmits the second coordinates to the projector 80.

The PC 50 can therefore correctly recognize the pointing element position in the second image 3b projected by the projector 80 by using the second coordinates that are converted coordinates in the coordinate system of the overall image 1.

A method for controlling the image display system 100 that allows an operation at a pointing element position in a projected image to be properly performed also when the PC 50 operates in the expansion mode can therefore be provided.

The PC 50 transmits data containing the first information and the second information to the projector 80, and the projector 80 acquires the first information and the second information from the received data.

The projector 80 can thus acquire the first information and the second information.

Second Embodiment

Procedure No. 1 of Pj Expansion and Adaptation Program

Figure 7:
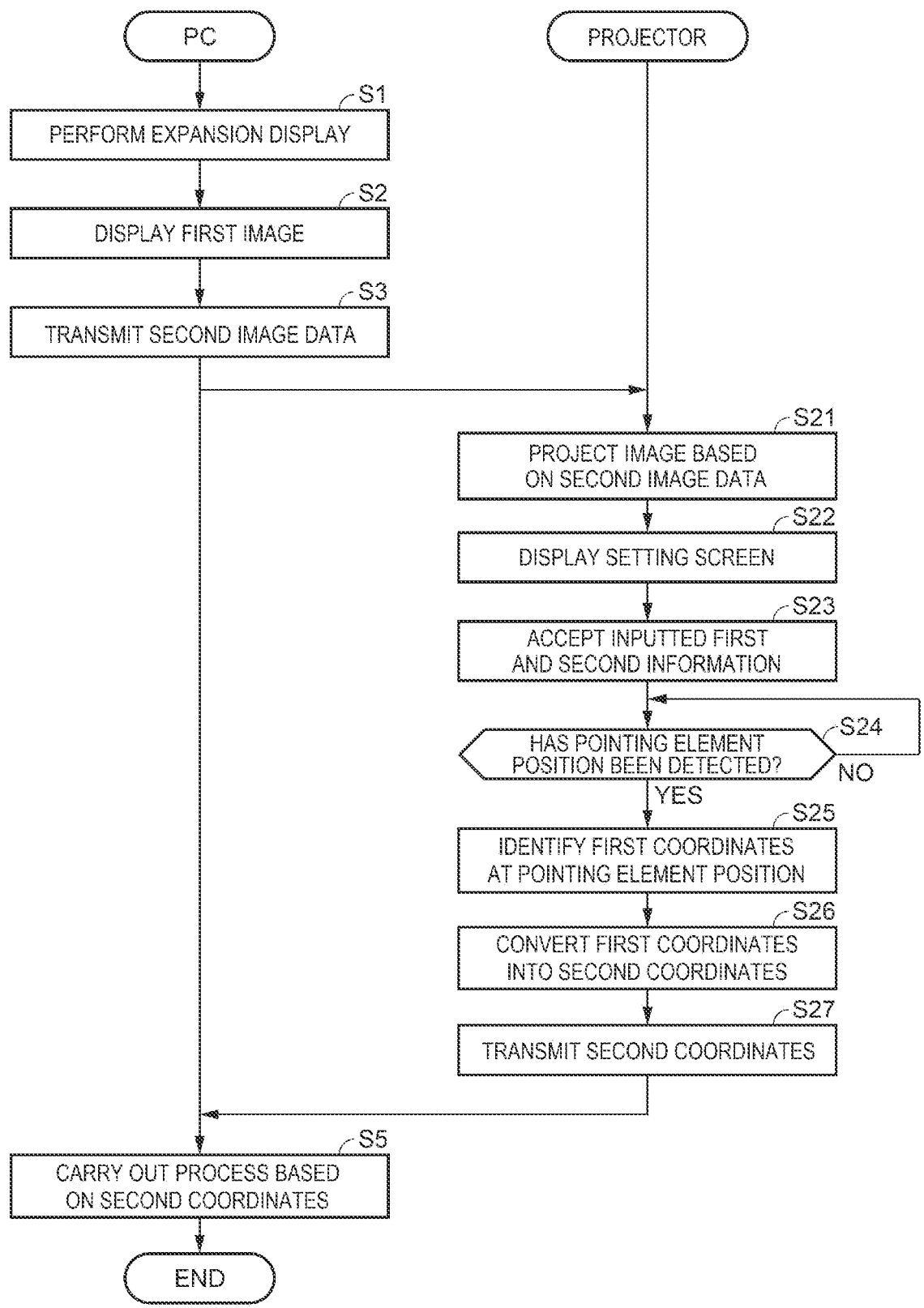
FIG. 7 is a flowchart of a Pj expansion and adaptation program in a second embodiment.
Figure 8:
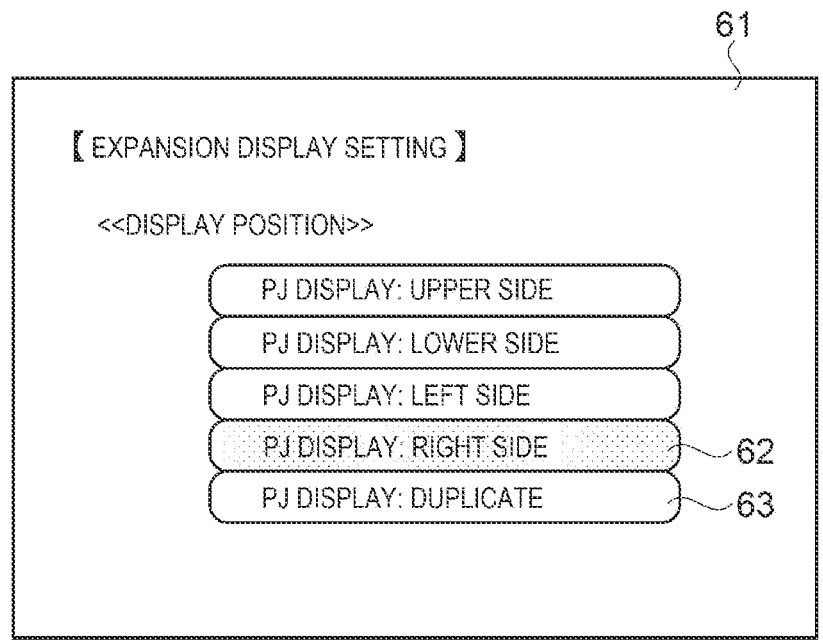
FIG. 8 shows an aspect of a second information setting screen.
Figure 9:
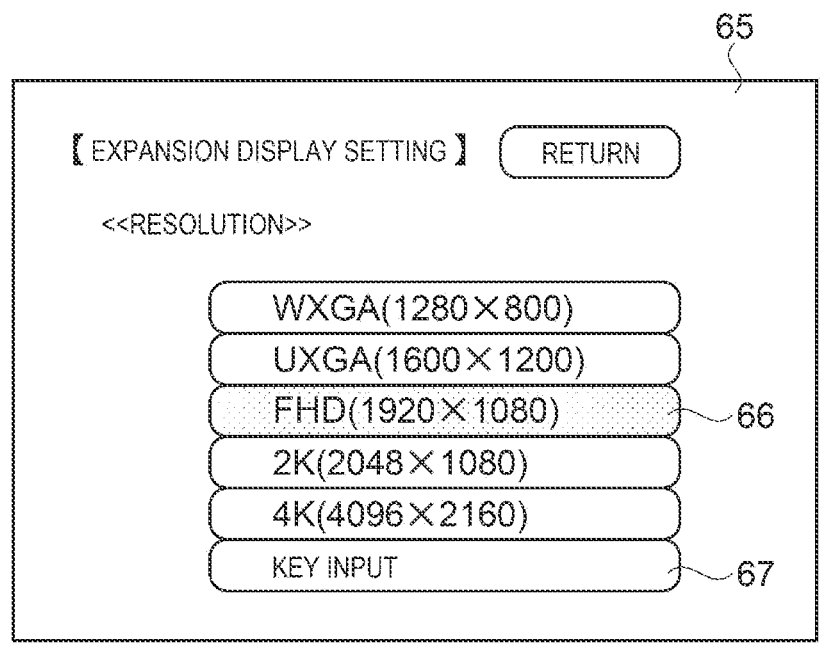
FIG. 9 shows an aspect of a first information setting screen.

FIG. 7 is a flowchart showing the procedure of processes in the Pj expansion and adaptation program. FIGS. 8 and 9 show an example of input setting screens to which the first information and the second information are inputted.

In the method employed in the first embodiment, the PC 50 proactively transmits the first information and the second information to the projector 80, and the present embodiment differs from the first embodiment in that the projector 80 proactively acquires the first information and the second information.

The present embodiment further differs from the first embodiment in that the PC 50 does not use the cable 7 in the present embodiment to transmit and receive image information to and from the projector 80 or vice versa but the wireless communication section 49 and the wireless communication section 25 of the PC 50 and the projector 80 are used to transmit and receive image information. Except for the points described above, the image display system according to the present embodiment is the same as the image display system 100 according to the first embodiment. In the following description, the same configuration portions as those in the first embodiment have the same reference characters, and no redundant description will be made.

First, the processes in steps S1 to S3 carried out by the PC 50 are the same as those described in the first embodiment, but the PC expansion and adaptation program is not activated when the expansion mode is selected in step S1. In other words, the present embodiment does not require a dedicated application program on the PC 50.

After the expansion mode is selected in step S1, the first image 2a based on the first image 2 is displayed on the PC 50 in step S2. Subsequently, in step S3, the PC 50 transmits image information containing an image signal carrying the second image 3 to the projector 80. The image information is transmitted from the wireless communication section 49 in a wireless LAN environment.

In step S21, the projector 80 projects the second image 3b based on the received image signal carrying the second image 3. In the present embodiment, when the projector is activated, the Pj expansion and adaptation program 39b in the storage section 21 is automatically activated.

In step S22, the projector 80 displays input setting screens to which expansion display setting contents are inputted. In detail, the OSD processing section 29 displays a setting screen 61 shown in FIG. 8 in such a way that the setting screen 61 is superimposed on the second image 3b.

The setting screen 61 is a screen to which the second information is inputted and lists items from which the position where the second image 3 is displayed in the expansion mode is selected. The items to be selected are formed of five items: the upper side; the lower side; the left side; the right side; and a duplicate as the display positions in the expansion mode of the projector 80.

In step S23, the projector 80 accepts the first information and the second information inputted to the selection screens. In detail, the user inputs the first information and the second information to the selection screens. The user selects the same item from the items to be selected in the setting screen 61 as the display position selected when the expansion mode is set on the PC 50.

For example, when the expansion mode is set as shown in FIG. 1, the user selects an icon 62 for "PJ display: Right" by using the arrow keys on the remote control 5. The selection causes the icon 62 to be display in reverse video, as shown in FIG. 8. Subsequently, when the user presses the enter key on the remote control 5, the second information representing that the second image is disposed on the right is inputted.

An icon 63 for "PJ display: Duplicate" is displayed in reverse video by default. Therefore, when no expansion setting has been made, pressing the enter key on the remote control 5 terminates the setting screen 61.

When the second information is inputted, the setting screen 61 switches to a setting screen 65 in FIG. 9.

The setting screen 65 is a screen to which the first information is inputted and lists items from which the resolution of the first image 2 is selected. The items to be selected are formed of six items for resolution: WXGA; UXGA; FHD; 2K; 4K; and key input. Other resolution options may be further provided.

For example, when the expansion mode is set as shown in FIG. 1, the user selects an icon 66 for "FHD (1920×1080)" by using the arrow keys on the remote control 5. The selection causes the icon 66 to be displayed in reverse video, as shown in FIG. 9. Subsequently, when the user presses the enter key on the remote control 5, the first information representing that the resolution of the first image is FHD is inputted, and the setting screen 65 is terminated.

When an icon 67 for "Key input" is selected, a separate screen to which the resolution is inputted is displayed, and the resolution can be manually inputted to the screen by using the numeric keypad of the remote control 5.

The subsequent steps S24 to S27 are the same as the steps S13 to S16 in the first embodiment. In detail, the projector 80 detects in step S24 the pointing element position when an operation is performed on the second image 3b. In step S25, the projector 80 identifies the first coordinates, which are the coordinates of the detected pointing element position.

Thereafter, in step S26, the first coordinates are converted into the second coordinates based on the first information and the second information inputted in step S23. In step S27, the projector 80 transmits the converted second coordinates to the PC 50.

In step S5, the PC 50 carries out a process based on the received second coordinates. For example, when the second coordinates (3470, 900) are received, the function associated with the page return icon 9 disposed at the pointing element position q in the second image 3 in FIG. 5 is executed.

As described above, in the present embodiment, the OSD processing section 29, which displays the selection screens that accept the first information and the second information, and the control section 20 function as the acquisition section.

As described above, the present embodiment can provide the following effects in addition to the effects provided by the first embodiment.

The projector 80 displays the setting screens 61 and 65 that prompt input of the first information and the second information and acquires the first information and the second information set in the setting screens 61 and 65.

The projector 80 can thus efficiently acquire the first information and the second information in a proactive manner with no need for a dedicated application program on the PC 50. The PC 50 can correctly recognize based on the first information and the second information the pointing element position in the second image 3b projected by the projector 80 by using the second coordinates that are converted coordinates in the coordinate system of the overall image 1.

An image display system 100 and a method for controlling the same that allow an operation at a pointing element position in a projected image to be properly performed also when the PC 50 operates in the expansion mode can therefore be provided.

Third Embodiment

Procedure No. 2 of Pj Expansion and Adaptation Program

Figure 10:
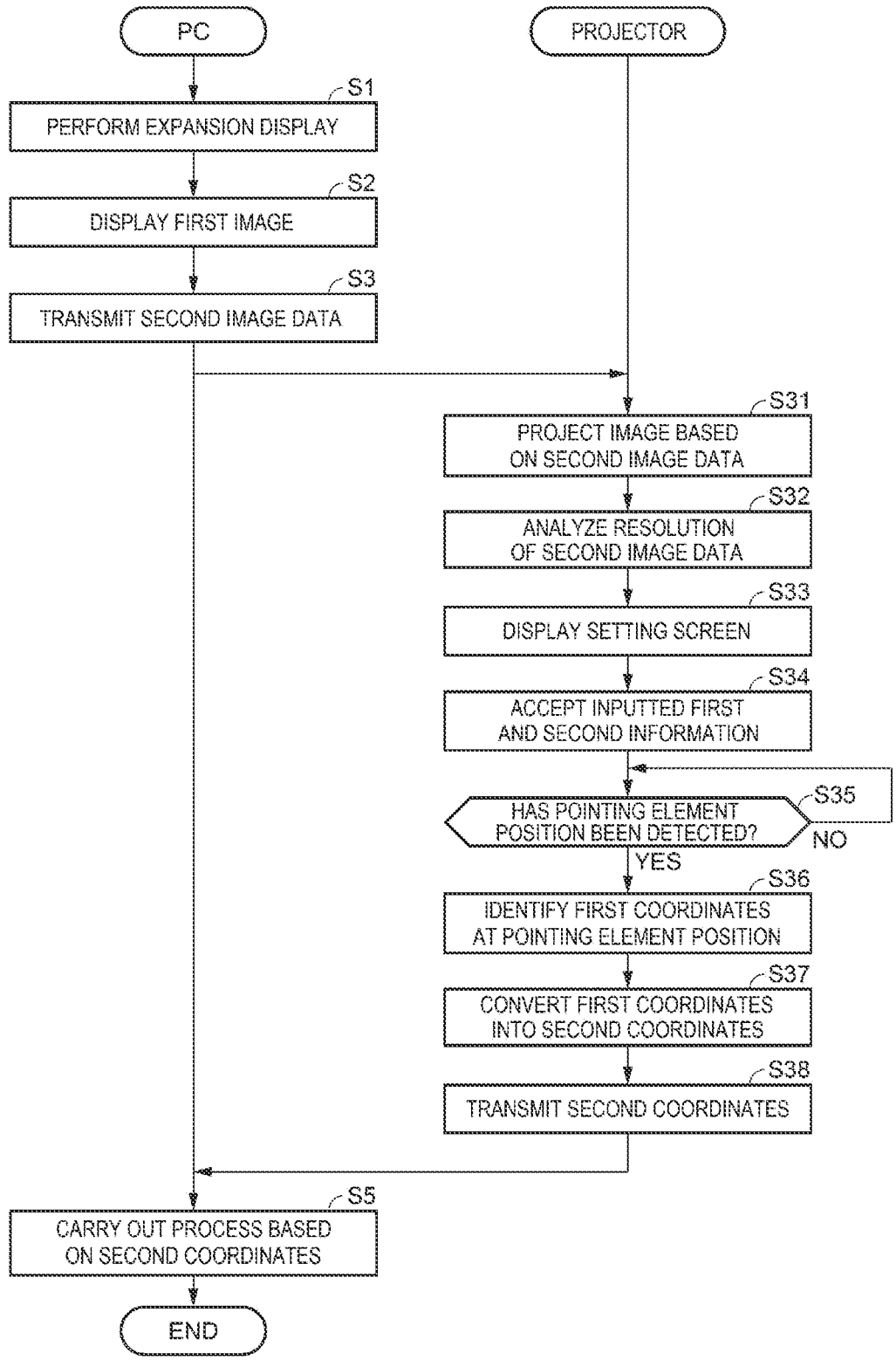
FIG. 10 is a flowchart of the Pj expansion and adaptation program in a third embodiment.

FIG. 10 is a flowchart showing the procedure of processes in the Pj expansion and adaptation program.

In the second embodiment, the first information and the second information inputted to the setting screens 61 and 65 are acquired, and the present embodiment differs from the second embodiment in that the acquisition of the first information is automated. The present embodiment is the same as the second embodiment in that the projector 80 proactively acquires the first information and the second information and the wireless communication section 49 of the PC 50 is used to transmit and receive image information to and from the wireless communication section 25 of the projector 80 and vice versa. In the following description, the same configuration portions as those in the embodiments described above have the same reference characters, and no redundant description will be made.

First, the processes in steps S1 to S3 carried out by the PC 50 are the same as those described in the first embodiment, but the PC expansion and adaptation program is not activated when the expansion mode is selected in step S1. In other words, the present embodiment does not require a dedicated application program on the PC 50.

After the expansion mode is selected in step S1, the first image 2a based on the first image 2 is displayed on the PC 50 in step S2. Subsequently, in step S3, the PC 50 transmits image information containing an image signal carrying the second image 3 to the projector 80. The image information is transmitted from the wireless communication section 49 in a wireless LAN environment.

In step S31, the projector 80 projects the second image 3b based on the received image signal carrying the second image 3. In the present embodiment, when the projector is activated, the Pj expansion and adaptation program 39c in the storage section 21 is automatically activated.

In step S32, the projector 80 analyzes the resolution of the received image signal carrying the second image 3. The projector 80 then estimates the analyzed resolution as the resolution of the first image 2. Since the first image 2 and the second image 3 typically have the same resolution in the expansion mode as described above, the resolution of the second image 3 is estimated to be equal to the resolution of the first image 2.

In step S33, the projector 80 displays the setting screen to which the second information in the expansion display is inputted. In detail, the OSD processing section 29 displays the setting screen 61 shown in FIG. 8 in such a way that the setting screen 61 is superimposed on the second image 3b. The user selects the same item from the items to be selected in the setting screen 61 as the display position selected when the expansion mode is set on the PC 50.

For example, when the expansion mode is set as shown in FIG. 1, the user selects the icon 62 for "PJ display: Right" by using the arrow keys on the remote control 5. The selection causes the icon 62 to be displayed in reverse video, as shown in FIG. 8. Subsequently, when the user presses the enter key on the remote control 5, the second information representing that the second image is disposed on the right is inputted, and the setting screen 61 is terminated. In the present embodiment, the setting screens are not switched from one to the other, unlike in the second embodiment.

The subsequent steps S35 to S38 are the same as the steps S13 to S16 in the first embodiment. In detail, the projector 80 detects in step S35 the pointing element position when an operation is performed on the second image 3b. In step S36, the projector 80 identifies the first coordinates, which are the coordinates of the detected pointing element position.

Thereafter, in step S37, the first coordinates are converted into the second coordinates based on the first information estimated in step S32 and the second information inputted in step S34. In step S38, the projector 80 transmits the converted second coordinates to the PC 50.

In step S5, the PC 50 carries out a process based on the received second coordinates. For example, when the second coordinates (3470, 900) are received, the function associated with the page return icon 9 disposed at the pointing element position q in the second image 3 in FIG. 5 is executed.

As described above, in the present embodiment, the control section 20, which analyzes the image signal carrying the second image 3 to acquire the first information, the OSD processing section 29, which displays the selection screen that accepts the second information, and the control section 20 function as the acquisition section.

As described above, the present embodiment can provide the following effects in addition to the effects provided by the embodiments described above.

The projector 80 estimates the first information based on the received image signal carrying the second image 3, displays the setting screen 61, which prompts input of the second information, and acquires the second information set in the setting screen 61.

The projector 80 can thus efficiently acquire the first information and the second information in a proactive manner with no need for a dedicated application program on the PC 50. Furthermore, the user's input operation requiring only the second information is simple. The PC 50 can correctly recognize based on the first information and the second information the pointing element position in the second image 3b projected by the projector 80 by using the second coordinates that are converted coordinates in the coordinate system of the overall image 1.

An image display system 100 and a method for controlling the same that allow an operation at a pointing element position in a projected image to be properly performed also when the PC 50 operates in the expansion mode can therefore be provided.

The functional portions of the projector 80 shown in FIG. 3 each represent a functional configuration and are each not necessarily implemented in a specific form. That is, hardware corresponding to each of the functional portions is not necessarily implemented, and a single processor that executes a program can, of course, achieve the functions of the plurality of functional portions. Furthermore, part of the functions achieved by software in the embodiments described above may be achieved by hardware, or part of the functions achieved by hardware in the embodiments described above may be achieved by software. In addition, the specific detailed configuration of each of the other portions of the projector 80 can be arbitrarily changed to the extent that the change does not depart from the substance of the present disclosure.

The above embodiments have been described with reference to a configuration using the projector 80 as the display apparatus, but the present disclosure is not limited thereto. For example, the display apparatus may be a liquid crystal display apparatus that displays images on a liquid crystal display panel, a display apparatus that displays images on an organic EL panel, or a self-luminous display apparatus, such as a monitor or a television. In this case, the display apparatus may include an imaging device, such as a CCD sensor or a CMOS sensor, to identify the position of the pointing element or a finger, or the display panel may be a touch panel.

What is claimed is:

1. A method for controlling an image display system, the method comprising:
    displaying, by an image supplier, a second image contained in a first image;
    transmitting, by the image supplier, an image signal based on a third image contained in the first image and different from the second image to a display apparatus;
    displaying, by the display apparatus, a fourth image based on the image signal;
    detecting, by the display apparatus, a position to which a pointing element is pointing on the fourth image;
    identifying, by the display apparatus, first coordinates in a coordinate system of the fourth image, the first coordinates represent the position to which the pointing element is pointing in the fourth image;
    acquiring, by the display apparatus, first information representing resolution of the second image and second information representing a position of the third image relative to the second image on the image supplier;
    converting, by the display apparatus, the first coordinates into second coordinates in a coordinate system of the first image, which represent a position in the first image, based on the first information and the second information;
    transmitting, by the display apparatus, the second coordinates to the image supplier;
    carrying out a process, by the image supplier, based on the second coordinates when the image supplier receives the second coordinates from the display apparatus;
    receiving, by the display apparatus, the image signal; and
    estimating, by the display apparatus, the first information based on the image signal.

2. The method for controlling an image display system according to claim 1, further comprising
    displaying, by the display apparatus, a setting screen that prompts input of the first information and the second information, and wherein
    the display apparatus acquires the first information and the second information set in the setting screen.

3. The method for controlling an image display system according to claim 1, further comprising
    transmitting, by the image supplier, data containing the first information and the second information to the display apparatus, and wherein
    the display apparatus receives the data and acquires the first information and the second information from the received data.

4. The method for controlling an image display system according to claim 1, further comprising:
    displaying, by the display apparatus, a setting screen that prompts input of the second information, and wherein
    the display apparatus acquires the second information set in the setting screen.

5. An image display system comprising:
    an image supplier; and
    a display apparatus provided so as to be bi-directionally communicable with the image supplier,
    wherein the image supplier displays a second image contained in a first image, and transmits an image signal based on a third image contained in the first image and different from the second image, and the display apparatus includes one or more processors programmed to receive the image signal and display a fourth image based on the received image signal, detect a position to which a pointing element is pointing on the fourth image, identify first coordinates in a coordinate system of the fourth image, which represent the position to which the pointing element is pointing in the fourth image, acquire first information representing resolution of the second image by estimating the first information based on the image signal and second information representing a position of the third image relative to the second image on the image supplier, convert the first coordinates into second coordinates in a coordinate system of the first image, which represent a position in the first image, based on the first information and the second information, and transmit the second coordinates to the image supplier.

6. A method for controlling a display apparatus, the method comprising:

communicating with an image supplier that displays a second image contained in a first image and transmits an image signal based on a third image contained in the first image and different from the second image;

displaying a fourth image based on the image signal received from the image supplier;

detecting a position to which a pointing element is pointing on the fourth image;

identifying first coordinates in a coordinate system of the fourth image, which represent the position to which the pointing element is pointing in the fourth image;

acquiring first information representing resolution of the second image and second information representing a position of the third image relative to the second image on the image supplier;

converting the first coordinates into second coordinates in a coordinate system of the first image, which represent a position in the first image, based on the first information and the second information;

transmitting the second coordinates to the image supplier;

receiving, by a display apparatus, the image signal; and estimating, by the display apparatus, the first information based on the image signal.

\* \* \* \* \*